US012643679B2

(12) United States Patent
De Plaen et al.

(10) Patent No.: US 12,643,679 B2
(45) Date of Patent: Jun. 2, 2026

(54) RAPID ATTACHMENT FOR A MOVABLE FLAP MODULE OF AN AIRCRAFT WING

(71) Applicant: SONACA, Gosselies (BE)

(72) Inventors: Didier De Plaen, Woluwé-Saint-Pierre (BE); Valerio Ascenzo, Anderlues (BE); Dimitri Gueuning, Rixensart (BE)

(73) Assignee: SONACA, Gosselies (BE)

( * ) Notice: Subject to any disclaimer, the term of this patent is extended or adjusted under 35 U.S.C. 154(b) by 21 days.

(21) Appl. No.: 18/698,469

(22) PCT Filed: Oct. 3, 2022

(86) PCT No.: PCT/EP2022/077450
§ 371 (c)(1),
(2) Date: Apr. 4, 2024

(87) PCT Pub. No.: WO2023/057377
PCT Pub. Date: Apr. 13, 2023

(65) Prior Publication Data
US 2024/0425171 A1 Dec. 26, 2024

(30) Foreign Application Priority Data

Oct. 7, 2021 (BE) .................................. 2021/5784

(51) Int. Cl.
*B64F 5/10* (2017.01)
*B64C 9/02* (2006.01)
*B64C 9/24* (2006.01)

(52) U.S. Cl.
CPC .................. *B64F 5/10* (2017.01); *B64C 9/02* (2013.01); *B64C 9/24* (2013.01)

(58) Field of Classification Search
CPC ................ B64F 5/10; B64C 9/02; B64C 9/24
See application file for complete search history.

(56) References Cited

U.S. PATENT DOCUMENTS 4,817,264 A * 4/1989 Worthing .......... B29C 66/72525
29/525.07
8,575,712 B2 * 11/2013 Vigier-Blanc ........ H10F 39/804
257/432

(Continued)

FOREIGN PATENT DOCUMENTS

| FR | 3094255 A1 | 10/2020 |
| GB | 2588658 A | 5/2021 |
| WO | 2018/211128 A1 | 11/2018 |

OTHER PUBLICATIONS

International Search Report for PCT/EP2022/077450 dated Mar. 26, 2024.

*Primary Examiner* — Kamini S Shah
*Assistant Examiner* — Tyler Dean Hedrick
(74) *Attorney, Agent, or Firm* — McDonald Hopkins LLC

(57) ABSTRACT

A method for manufacturing a connecting part between a wing box and a leading edge module. The method comprises performing a three-dimensional scanning of a first representative part of the wing box to obtain a first computer model and performing a three-dimensional scan of a second representative part of the leading edge module in order to obtain a second computer model. The first part comprises a first reference region and a first connecting region, the second part comprises a second reference region and a second connecting region. A relative position of the first reference region is defined with respect to the reference region. From the first and second computer model, the connecting part is configured to connect the first and the second connecting region such that the first and the second reference region are located in said relative position. The connecting part is then manufactured.

6 Claims, 7 Drawing Sheets

(56)          References Cited

U.S. PATENT DOCUMENTS

| | | | |
|---|---|---|---|
| 2008/0256788 A1* | 10/2008 | Glazebrook | B64F 5/10 |
| | | | 29/700 |
| 2015/0108272 A1* | 4/2015 | Picot | B64C 1/0009 |
| | | | 244/119 |
| 2024/0003258 A1* | 1/2024 | Jacquemard | F01D 5/026 |

* cited by examiner

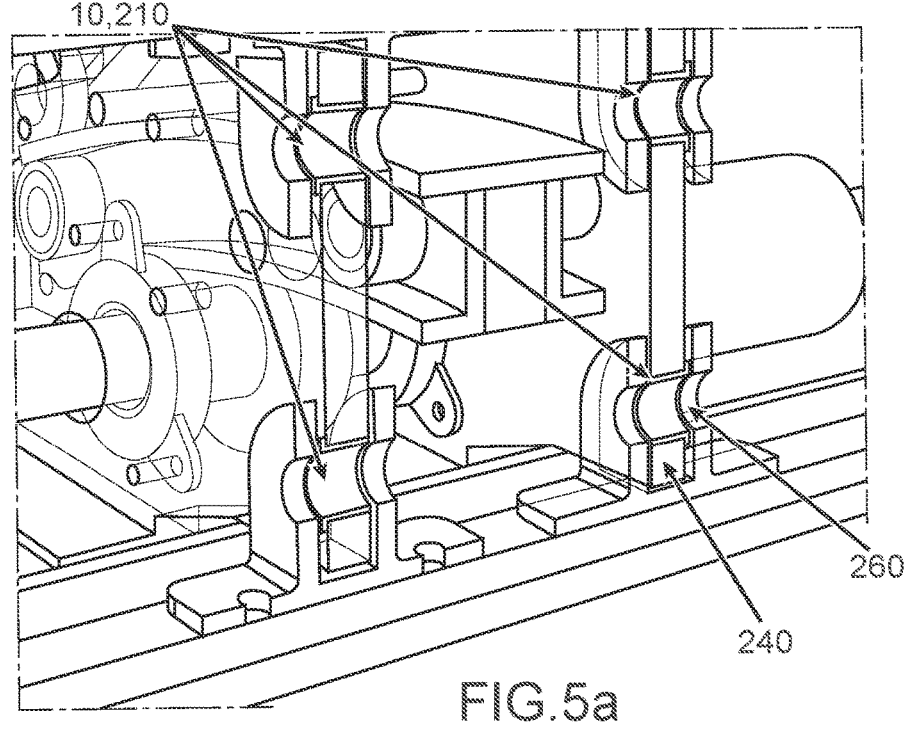
FIG.5a
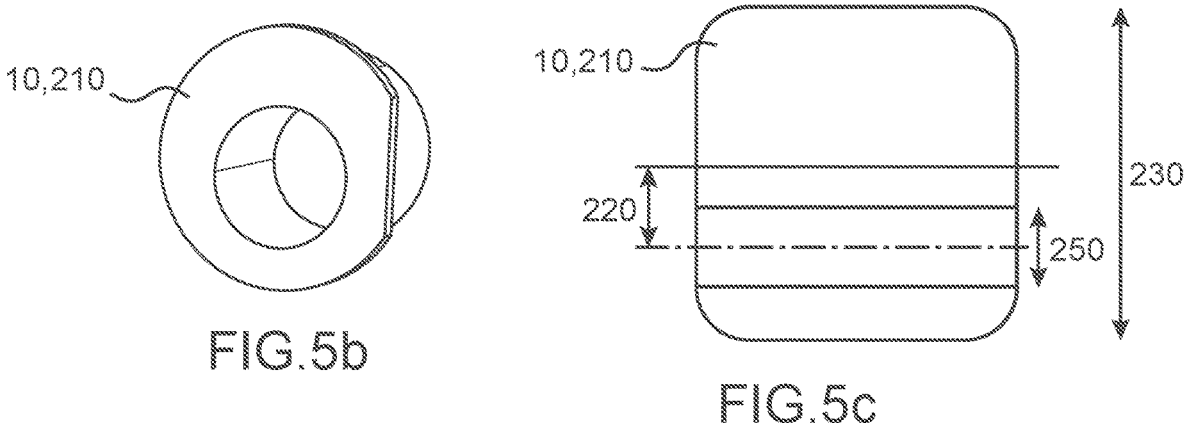
FIG.5b
FIG.5c

RAPID ATTACHMENT FOR A MOVABLE FLAP MODULE OF AN AIRCRAFT WING

CROSS-REFERENCE TO RELATED APPLICATIONS

This is the National Stage application of PCT international application PCT/EP2022/077450, filed on Oct. 3, 2022, which claims the priority of Belgian Patent Application No. 2021/5784, filed Oct. 7, 2021, both of which are incorporated herein by reference in their entireties.

DESCRIPTION

Technical Field and Prior Art

The present invention relates to the field of aircraft wings, of the type comprising a load-bearing central wing body, which remains fixed and which bears one or more movable leading edge flaps, also referred to as "slats".

Each of the two wings of the airfoil is generally fitted with movable high-lift flaps, mounted on the leading edge of the wing. The flaps are deployed during the landing and take-off phases in order to increase the lift at low or medium speeds. When cruising at high speed, the movable flaps are retracted to limit resistance to the forward movement of the aircraft.

Today, fitting the fixed leading edges and movable flaps to the wing involves a number of operations. The fixed leading edges and movable flaps consist of multiple parts, comprising for example ribs, skins, electrical systems, as well as guide rails, hinges and pivoting arms, to enable the movable part to be given the desired movement. During the assembly of the fixed leading edge and the movable flaps, these different parts are integrated individually into the wing by operations, including drilling and riveting to form the fixed leading edge and bolting and adjusting to mount the movable flaps. During this time, other work on the wing cannot be carried out and the assembly line remains blocked. In addition, the drilling operations tend to deposit metal shavings in removable parts of the wing, which are then at risk of getting damaged when they move.

Thus, it would be advantageous to configure a leading edge module, comprising the fixed leading edge, the movable flap with its removable parts, which can be mounted on the wing without the need to carry out drilling operations on the assembly line.

DISCLOSURE OF THE INVENTION

It is therefore an objective of the present invention to provide a method for manufacturing a connecting part between a wing box and a leading edge module, the method comprising the steps according to claim 1.

The first reference region, the second reference region and said relative position may be configured to uniquely determine a relative position between the wing box and the leading edge module.

It is also possible that the first reference region comprises a first device fixed to the wing box and/or that the second reference region comprises a second device attached to the leading edge.

Advantageously, the connecting part comprises an eccentric guide ring and the step of designing the connecting part to provide a connection between the first and second connecting region comprises adapting at least one eccentricity of the ring to make an outside of the ring coincide with a first aperture and an inside of the ring coincide with a second aperture, the first and second aperture being located in the connecting region.

Preferably, the first reference region comprises a top row of spar fasteners and/or a bottom row of spar fasteners and/or a second reference region comprises an upper surface of the main rib.

It is possible that the three-dimensional scanning is performed by a 3D scanner or a stereovision device.

The connecting part can be manufactured by a mechanical machining process or by a 3D printing process.

The objective of the invention is also an assembly.

In said assembly, at least one distance measured on the first part may be different from the same distance measured on the second part, preferably the difference being 3% or more.

The objective of the invention is also an assembly formed by a first aircraft comprising a first wing, and a second aircraft fitted with a second wing, the first and the second aircraft being of the same type,
the first wing comprising a first leading edge module attached to a first box of the first wing by a first connecting part located in a position in the first wing,
the second wing comprising a second leading edge module attached to a second box of the second wing by a second connecting part located in said position in the second wing,
the two said connecting parts each being a ring,
the two said connecting parts being produced according to the method described above,
the first connecting part not being interchangeable with the second connecting part.

BRIEF DESCRIPTION OF THE DRAWINGS

The present invention will be better understood on the basis of the following description and the appended drawings wherein:

FIGS. 5a, 5b and 5c show a ring as a connecting part.

DETAILED DISCLOSURE OF PARTICULAR EMBODIMENTS

Figure 1:
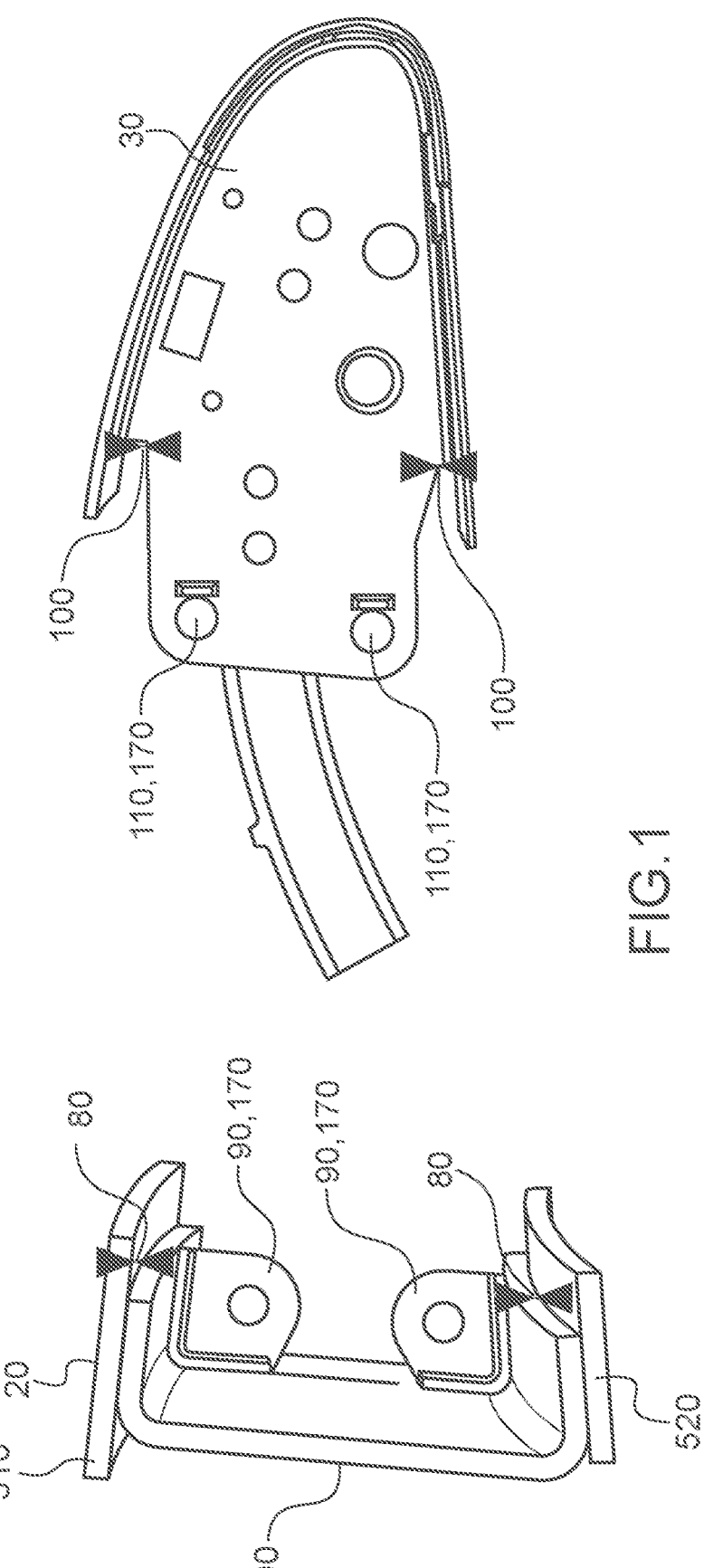
FIG. 1 shows a fixed leading edge module and the front part of a wing box of an aircraft wing.

FIG. 1 shows a fixed leading edge module 30 of the front part of a wing box 20 of an aircraft wing.

The wing box is delimited by a wing spar 500, a top skin 510 and a bottom skin 520. The wing box comprises a first connecting region 90, configured to mount the leading edge module. In the example shown in FIG. 1, the first connecting region comprises eyelets 170.

The leading edge module 30 comprises in turn a second connecting region 110, configured to enable the leading edge module to be fixed to the wing box. In the example shown, there are one or more eyelets.

Figure 7:
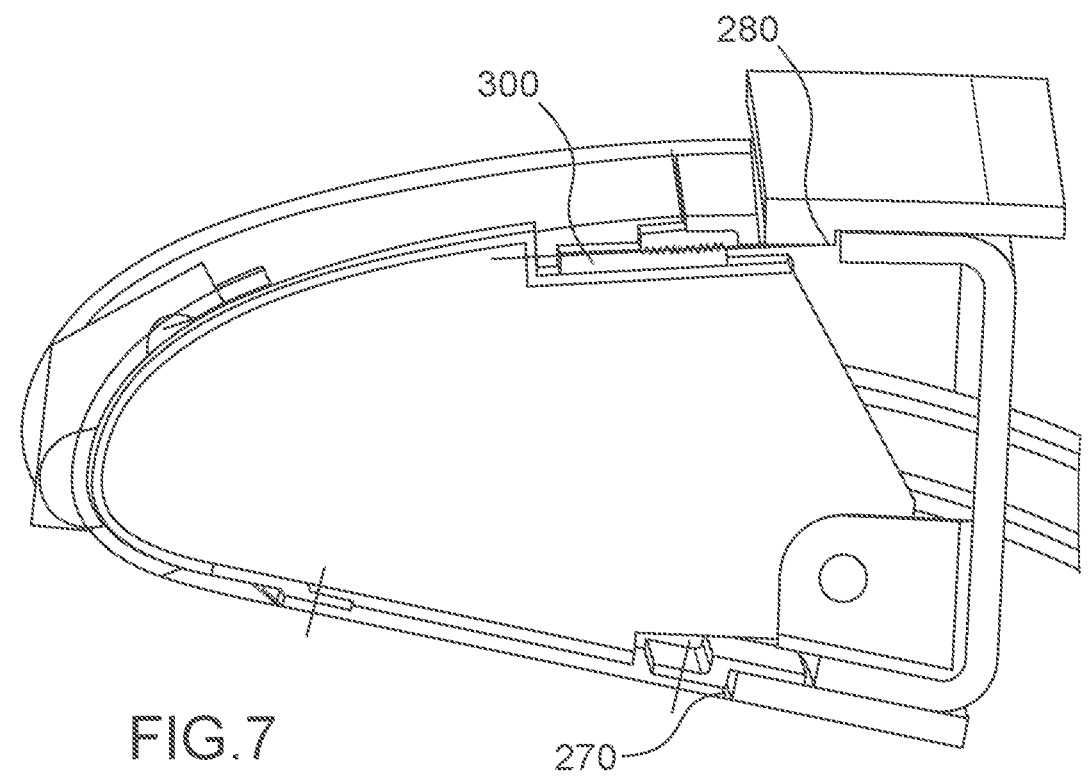
FIG. 7 shows reference regions.
Figure 8:
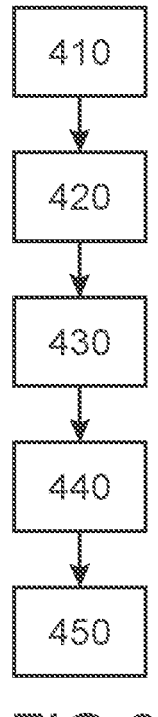
FIG. 8 shows steps of a method for producing a connecting part.

FIG. 8 shows a method for producing a connecting part between the wing box 20 and the leading edge module 30, said part being provided to fix the leading edge module to the wing box. The method will be explained in the following with reference to FIGS. 2 to 7.

In a first step 410, a three-dimensional scan of a first part representative of the wing box 40 is performed to obtain a first computer model 50.

Figure 2:
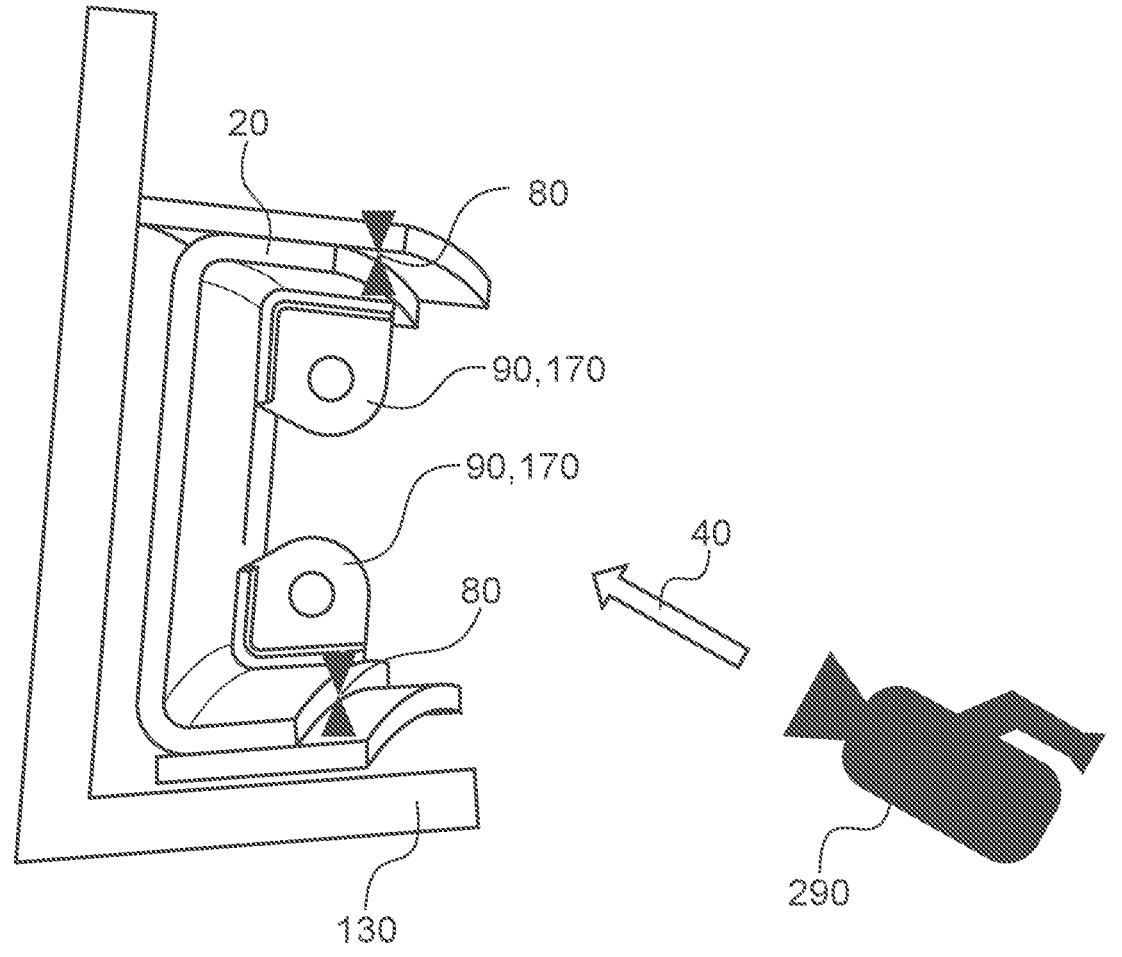
FIG. 2 shows the wing box comprising a first connecting region.

FIG. 2 shows the wing box 20 comprising the first connecting region 90. A scanning device 290 is also shown. This may be for example a three-dimensional 3D scanner or a stereovision device. The scanning device is configured to perform the three-dimensional scanning of the first representative part of the wing box. The said representative part may be for example an interior of the wing box. In this case, the scanning device is oriented for example to obtain a computer model of the interior of the wing box. The first representative part comprises the first connecting region 90 and a first reference region 80. Thus, a first computer model obtained from said scanning comprises the first connecting region and the first reference region.

The first reference region is a visible part in the computer model having a fixed or temporarily fixed position relative to the first connecting region. For example, as indicated in FIG. 2, the first reference region 80 can be a top edge and/or a bottom edge of the wing box. In this case, this position is fixed. The first reference region may also be a line or a quarter located on a transport frame attached to the wing box. In this case, this position is temporarily fixed, while the wing box remains connected to the transport frame.

In a second step, a three-dimensional scanning of a second representative part of the leading edge module 60 is performed in order to obtain a second computer model 70.

Figure 3:
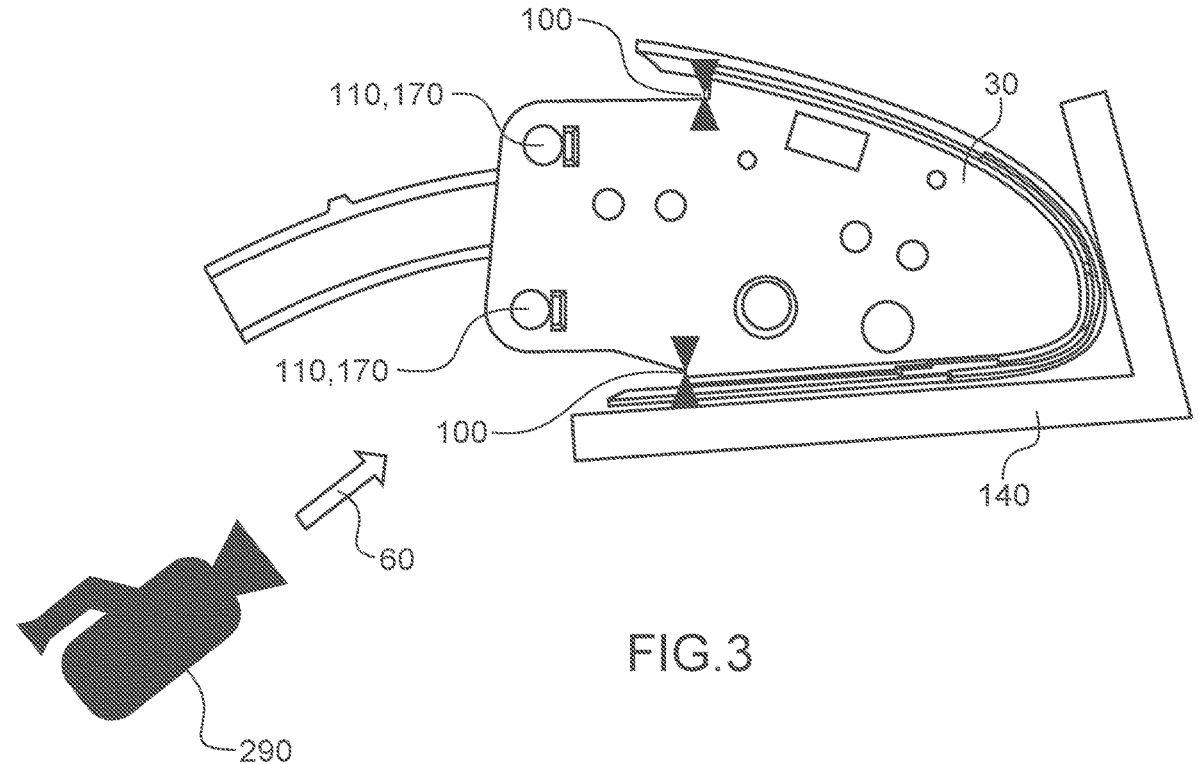
FIG. 3 shows the leading edge module comprising a second connecting region.

FIG. 3 shows the leading edge module 30 including the second connecting region 110. The scanning device 290 is, in this case, oriented and configured to perform the three-dimensional scanning of the second representative part of the leading edge module. In a similar manner to the one described above, the second representative part comprises the second connecting region 110 and a second reference region 100. The second computer model comprises and thus shows the second connecting region and the second reference region.

In the case shown in FIG. 3, the second reference region is an interior of the leading edge module comprising a top edge and/or a bottom edge of the leading edge and/or a surface of the central rib. As described above, the second reference region has a fixed or temporarily fixed position relative to the second connecting region. For example, the second reference region may be located on a transport frame 140 of the leading edge module.

In a third step 430 a relative position 120 of the first reference region relative to the second reference region is defined.

Figure 4A:
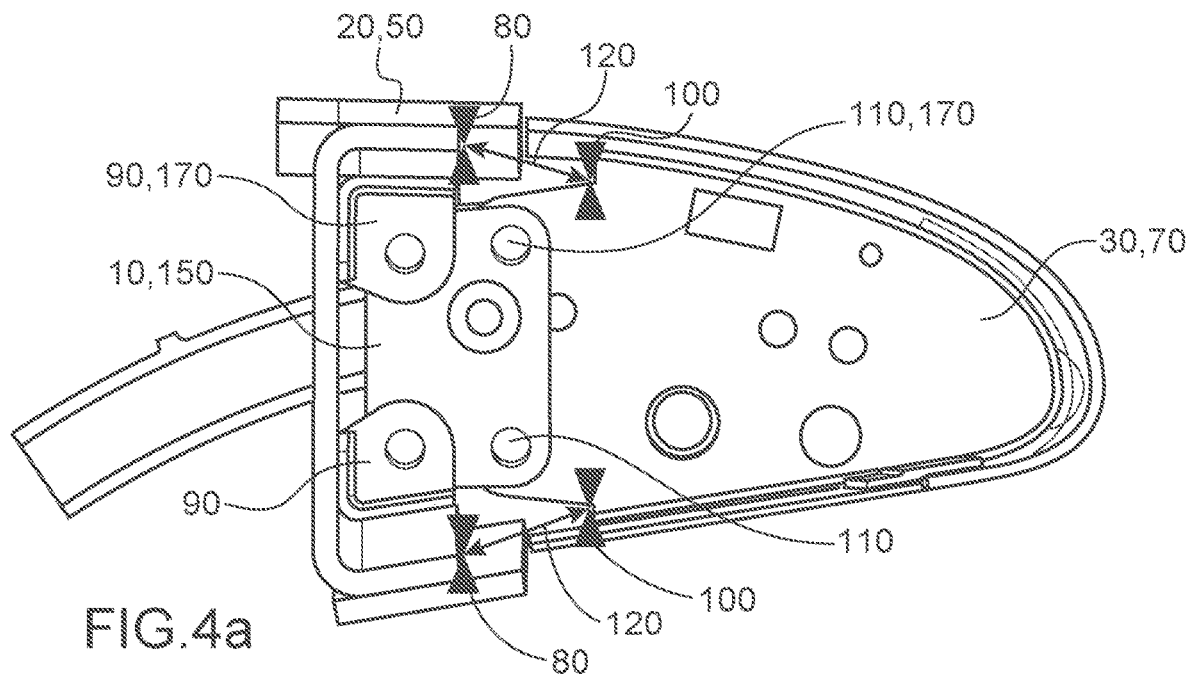
FIGS. 4a and 4b show a computer model and a plate as a connecting part, not covered by the present invention.

FIG. 4a shows the first computer model 50 of the wing box 20 and the second computer model 70 of the leading edge module 30. As the scanned models have been obtained, by means of the scanning device 290, from manufactured parts, said models show any possible manufacturing hazards. In other words, the relative dimensions of the two manufactured parts (the leading edge module and the particular wing box which has been scanned) are represented by the respective scanned models. The first computer model also comprises the first reference region 80, located on the wing box, and the first connecting region 90. The second computer model 70 comprises the second reference region 100 and the second connecting region 110.

The relative position 120 of the first reference region relative to the second reference region may be a distance for example. The relative position 120 may also be a vector defined in a three-dimensional space. For example, said vector may be defined in a reference frame fixed to the wing box or fixed to the leading edge module. It is also possible to provide a plurality of first reference regions and/or a plurality of second reference regions and/or to define a plurality of associated relative positions. For example, as shown in FIG. 4a, two first reference regions and two second reference regions have been identified. In this case, two relative positions 120 are defined.

The first and second reference region and said relative position are configured so as to obtain a relative position of the leading edge module and the wing box as intended for the construction of the aircraft wing.

Preferably, combination of the first reference region, the second reference region and said relative position is configured to uniquely determine a relative position between the wing box and the leading edge module.

As seen from the wing box or from the leading edge module, the other part to be fitted has six degrees of freedom. In a Cartesian reference frame fixed to one of the two parts (the leading edge module or the wing box), the other part has three degrees of freedom in translation, in an x, y and z direction. The other part also has three degrees of freedom in rotation, about the x, y and z axis.

Preferably, the combination of the first reference region, the second reference region and said relative position is thus configured to determine said six degrees of freedom (three degrees of translation and three degrees of rotation) of the leading edge module relative to the wing box, or vice versa.

In a fourth step 440, the connecting part 10 is configured from the first and second computer model, the models placed in the relative position as defined in the third step, described above.

The connecting part is configured to provide a connection between the first and the second connecting regions. As the connecting part is configured whilst the first and second models are placed in said relative position, the connecting part will connect and hold the leading edge module relative to the wing box as provided by the relative position. Thus, the leading edge module will be located relative to the wing box as required by the construction of the aircraft wing.

Figure 4B:
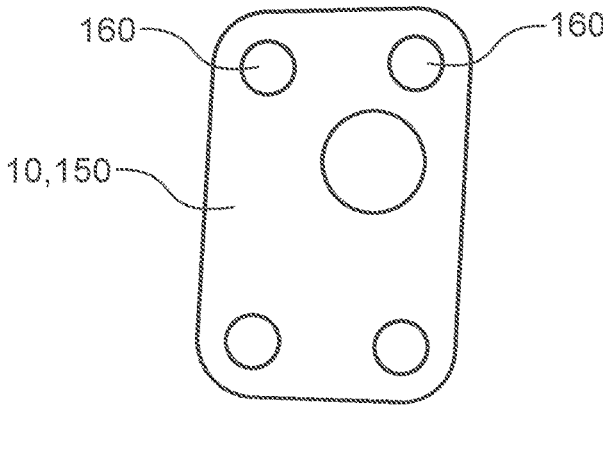

FIG. 4b shows an isolated connecting part 10, solely by way of illustration and not covered by the invention. FIG. 4a shows a computer model of the same connecting part located between the computer model of the wing box and the computer module of the leading edge to provide a connection so as to establish the relative position 120 between the first and the second connecting region.

In a fifth step, the connecting part is made. For example, the connecting part can be made by a mechanical machining process or by a 3D printing process.

In the example shown in FIGS. 4a and 4b, not covered by the invention, the connecting part 10 comprises a plate 150. Said plate comprises at least two fixing apertures 160, provided to make a connection with the first and the second connecting region and thus establish the connection between the wing box and the leading edge module. The first and the second connecting region may comprise eyelets 170, as shown in FIGS. 1, 2, 3 and 4a. The fixing apertures 160 in the connecting plate are thus configured to make a connection with the eyelets in the first and second region, for example by a screw or a rivet.

The step of configuring the connecting part includes locating the apertures on the connector plate so that the plate can be secured between the eyelets 170 such that the first and the second reference region are located in said relative position 120. To achieve this, the first and second computer model of the first and second representative parts of the wing box and leading edge module are positioned so as to establish the relative position 120 between the first and second reference region, as shown in FIG. 4a. Then, the computer model of the plate 150 is positioned between the eyelets of the first and second connecting region. The fixing apertures 160 are positioned on the plate so as to coincide with the eyelets. Then, the plate comprising the fixing apertures is made, as shown in FIG. 4b.

The manufactured plate is then mounted between the eyelets of the wing box and the eyelets of the leading edge module, for example by passing screws through the respective apertures. As a result of the manufacturing method described above, the first and the second reference region will be held in the chosen relative position 120 once the plate is mounted between the eyelets of the two connecting regions. The leading edge module is thus mounted on the wing box as provided by the construction of the aircraft wing.

In an advantageous manner, the first and the second computer model can be acquired before the leading edge module arrives at the aircraft wing production line. For example, the aircraft wing comprising the wing box but without the leading edge module may be on a production line of the aircraft manufacturer. The first computer model of the wing box can be acquired from the manufacturer without preventing other work from taking place on the wing. The leading edge module can be located at a supplier's and the second computer model can be established by said supplier. The plate (150) can then be designed and manufactured. Once the leading edge module and the plate have been delivered to the manufacturer, the leading edge module can be mounted directly on the wing box without any need for drilling or fitting operations. The method of manufacturing the connecting part described above ensures that the leading edge module is fixed in the desired position relative to the wing box.

FIGS. 5a, 5b and 5c show a connecting part according to the invention. The connecting part can comprise an eccentric guide ring 210, as shown in FIG. 5b. FIG. 5c shows a cross-section of the ring 210. The ring has an outer diameter 230 and an inner diameter 250. A central axis of the inner diameter is displaced relative to a central axis of the outer diameter by an eccentricity 220 of the ring.

In this case, the first and the second connecting region comprise a first aperture 240 and a second aperture 260, as shown in FIG. 5a, located on the wing box and the leading edge module. The step of configuring the connecting part to provide a connection between the first and the second connecting region comprises the fact of adjusting at least the eccentricity 220 of the ring. It is also possible to adjust the outer diameter and/or the inner diameter of the ring.

To design the ring, the first computer model and the second computer model of the wing box and the leading edge module are located in the relative position 120 as described above. Then, a computer model of the ring is configured to make an outside of the ring 230 coincide with the first aperture 240 and an interior 250 of the ring coincide with the second aperture 260. In other words, following this adjustment and holding the wing box and the leading edge module in said relative position 120, the outside of the ring can be inserted into the first aperture. A screw or a rivet can, at the same time, be passed through the inside of the ring and the second aperture. As described above, the eccentricity 220 of the ring is adjusted for this purpose. It is also possible to adjust the outer diameter 230 and/or the inner diameter 250 of the ring. Of course, the first aperture can be located on the wing box and the second aperture can be located on the leading edge module or vice versa. The ring is then produced from the computer model of the ring.

The leading edge module is then mounted on the wing box by using the ring produced from the computer model. As shown in FIG. 5a, the ring is used to establish the connection between the apertures of the first connecting region and the apertures of the second connecting region. For example, a screw can be used to fix the connection. The adaptation of the ring as described above means that the leading edge module and the wing box which are the origin of the first and second computer model are held in the relative position 120. Thus, the leading edge module is fitted to the wing box as intended for the manufacture of the aircraft wing.

Figure 6A:
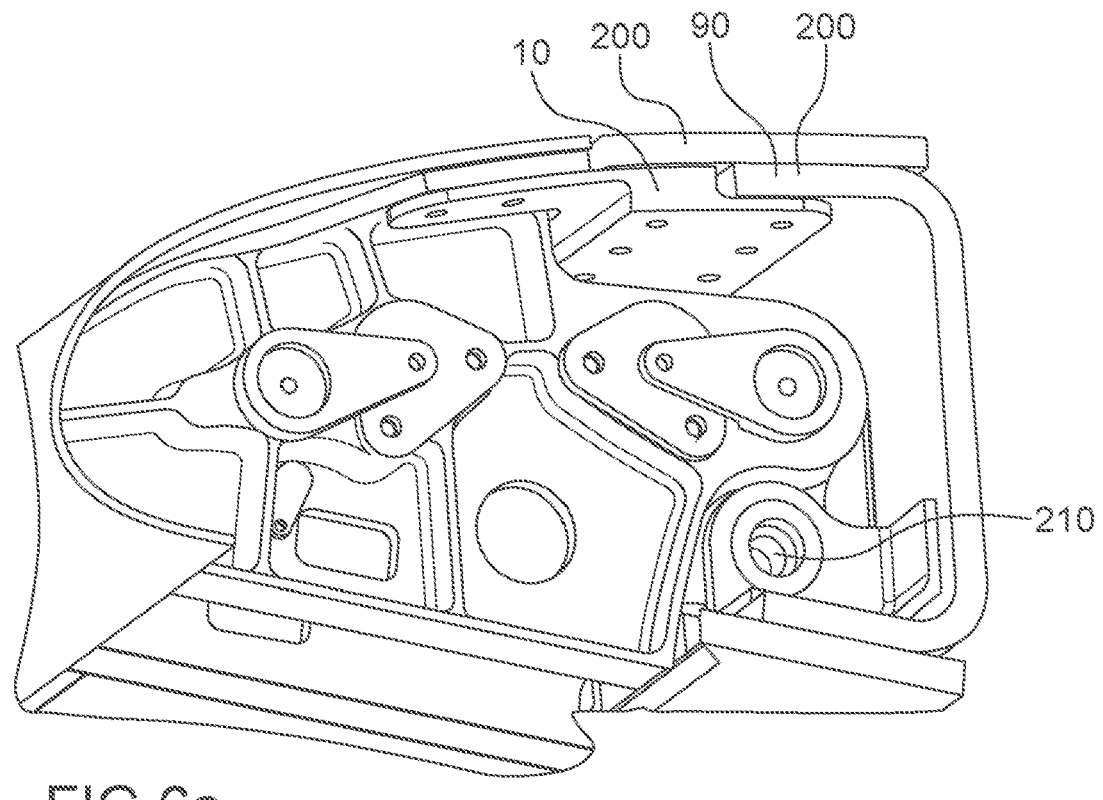
FIGS. 6a, 6b and 6c show a multi-level plate as a connecting part, not covered by the present invention.
Figure 6B:
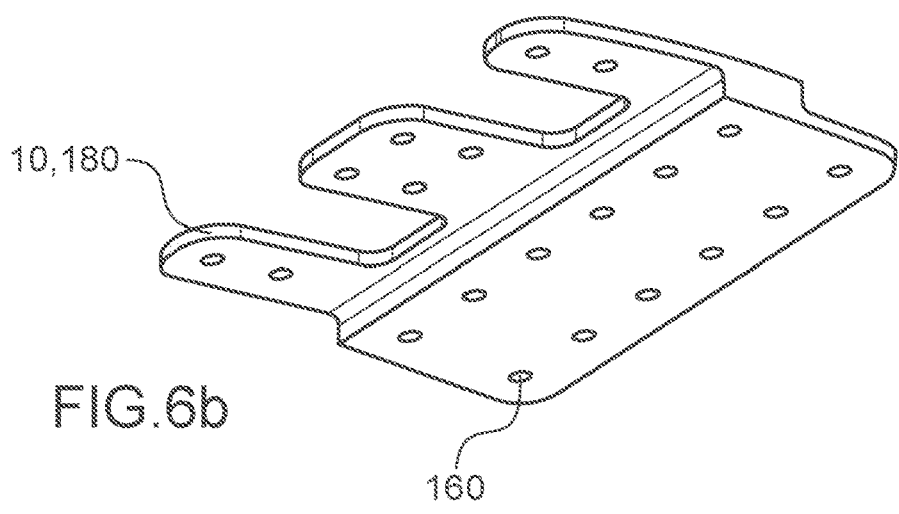
Figure 6C:
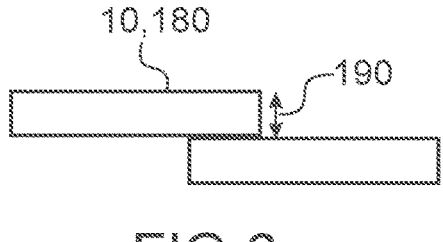

FIGS. 6a, 6b and 6c show another connecting part, solely for illustrative purposes and not covered by the invention. FIG. 6b shows a multi-level plate 180 which is an alternative to the plate 150 shown in FIG. 4b. As with the plate described above, fixing apertures 160 on the plate are located on the plate in order to fix the plate between the first and the second connecting region. The position of the fixing apertures is established as described above for the plate 150 shown in FIG. 4b. Said multi-level plate 180 is provided to establish a connection between two surfaces 200 located on the first and second connecting region, as shown in FIG. 6a. The multi-level plate has a relative distance 190 between the levels of the plate, shown in FIG. 6c, used to establish the link between the two surfaces 200 forming part of the wing box and the leading edge module.

According to the method described, the first and the second computer model each comprise both a reference region and a connecting region. To design the connecting part, the reference regions are used to establish a relative position. The connecting part is then adjusted according to the connecting region. For the connecting part and the leading edge module, the reference region and the connecting region are thus in a fixed or temporarily fixed relative position. In other words, the first reference region is in a fixed or temporarily fixed position relative to the first connecting region. The second reference region is in a fixed or temporarily fixed position relative to the second connecting region.

For example, the first reference region may comprise a first device fixed or temporarily fixed to the wing box 130. The second reference region may comprise a second device attached to the leading edge 140. FIGS. 2 and 3 show an example of a device temporarily fixed to the wing box 140 or a device temporarily fixed to the leading edge module 140. In the cases shown in FIGS. 2 and 3, a transport frame has been fixed to the wing box and/or to the leading edge module. As the transport frame remains temporarily fixed, a temporarily fixed relative position is established between a reference region located on said frame and a connecting region of the leading edge module or the wing box.

The first and the second reference region can also form part of the wing box and the leading edge module.

For example, as shown in FIG. 7, the first reference region can comprise a top row of spar fasteners 270. The first reference region may also comprise a bottom row of spar fasteners 280. The second reference region may for example comprise the top surface of the main rib 300.

Once the connecting part has been manufactured, it is used in the wing box and leading edge module assembly. It is also possible to use a plurality of connecting parts to fix the leading edge module to the wing box, each of the connecting parts manufactured according to the method described above. It is thus possible to use a plurality of rings 210. Two or more connecting parts are referred to as being "of the same" type if each of the connecting parts is a ring. A plurality of parts of the same type used to fix the same leading edge module and wing box are referred to as a "set of parts of the same type". The leading edge module and the wing box can thus be fixed by one or more sets of parts of the same type.

Each individual connecting part has been adjusted to the particular dimensions and positions determined by the first and second connecting region which will be linked by this particular connecting part.

As a result, the different parts forming part of a set of parts of the same type are all different from one another. In other words, a first and a second ring forming part of the same set will be different at least with respective to their eccentricity. At least one distance measured on the first part is different from the same distance measured on the second part, said distance being for example the eccentricity or a distance of a fixing aperture of an edge of the plate.

In this manner, in an wing box and leading edge module assembly in which the leading edge module is fixed to the wing box by a first and a second connecting part of the same type, the two said connecting parts being a ring, the first connecting part is not interchangeable with the second connecting part.

In other words, as each connecting part is adjusted individually to its position in the assembly between the leading module and the wing box, a first and a second connecting part of the same type cannot be exchanged or change place with one another.

In the same manner, two connecting parts of the same type used in a first wing intended to fit a first aircraft and a second wing intended to fit a second aircraft cannot be exchanged or change place with one another. More specifically, the first part is located in a position in the first wing. The second part is located in the same position in the second wing. As the first and the second aircraft are of the same type, the same position exists in the first and in the second wing. Thus, the first and the second connecting part are of the same type, namely a ring.

In other words, in an assembly of a first wing intended to equip a first aircraft and a second wing intended to equip a second aircraft, the first and the second aircraft being of the same type, the first connecting part is not interchangeable with the second connecting part. As already described, the first wing comprises a first leading edge module fixed to a first box of the first wing by a first connecting part located in a position in the first wing and the second wing comprises a second leading edge module fixed to a second box of the second wing by a second connecting part located in said position in the second wing.

In particular, the two parts are not interchangeable because at least one distance measured on the first part is different from the same distance measured on the second part.

Said measured distance can be for example a ring eccentricity (220). In this case, the difference is greater than 0 mm and less than 1.2 mm. According to another example the distance measured is an opening position on a plate. In this case, the difference is greater than 0 mm and less than 0.7 mm. The measured distance can be distance between a centre of the aperture and an edge of the plate.

It should be noted that the above assembly, which comprises the first wing and the second wing, can in fact comprise an even greater number of wings based on the same principle. For example, such an assembly can be found on a manufacturing site for aircraft wings.

Similarly, the invention can be in the form of an assembly consisting of a first aircraft comprising a first wing, and a second aircraft fitted with a second wing, the first and the second aircraft being of the same type, the first wing comprising a first leading edge module attached to a first box of the first wing by a first connecting part located in a position in the first wing, the second wing comprising a second leading edge module attached to a second box of the second wing by a second connecting part located in said position in the second wing, the two said connecting parts each being a ring, the two said connecting parts being produced according to the method described above, the first connecting part not being interchangeable with the second connecting part.

For example, such an assembly can be found on an aircraft assembly/construction site.

What is claimed is:

1. A method for manufacturing a connecting part between a wing box and a leading edge module, the method comprising the steps:

performing a three-dimensional scan of a first representative part of the wing box to obtain a first computer model, performing a three-dimensional scan of a second representative part of the leading edge module in order to obtain a second computer model, the first part comprising a first reference region and a first connecting region, the second part comprising a second reference region and a second connecting region, defining a relative position of the first reference region with respect to the second reference region, from the first and second computer model, configuring the connecting part to provide a connection between the first and the second connecting region such that the first and the second reference region are located in said relative position, manufacturing the connecting part, the connecting part comprising an eccentric guide ring and the step of configuring the connecting part to provide a connection between the first and the second connecting region comprises adjusting at least one eccentricity of the ring to coincide an exterior of the ring with a first aperture and an interior of the ring with a second aperture, the first and second aperture being located in the connecting region.

2. The method according to claim 1 in which the combination of the first reference region, the second reference region and said relative position is configured to uniquely determine a relative position between the wing box and the leading edge module.

3. The method according to claim 1 in which
the first reference region comprises a first device fixed to the wing box and/or
the second reference region comprises a second device fixed to the leading edge.

4. The method according to claim 1 in which
the first reference region comprises a top row of spar fasteners and/or a bottom row of spar fasteners and/or
the second reference region comprises a top surface of the main rib.

5. The method according to claim 1 in which the three-dimensional scanning is performed by a 3D scanner or a stereovision device.

6. The method according to claim 1 in which the connecting part is manufactured by a mechanical machining process or by a 3D printing process.

\* \* \* \* \*